US008961308B2

(12) United States Patent
Muir et al.

(10) Patent No.: US 8,961,308 B2
(45) Date of Patent: *Feb. 24, 2015

(54) GAMING MACHINE DISPLAY WITH A PLURALITY OF ZONES INDEPENDENTLY ADDRESSABLE TO SELECTIVELY OPERATE IN ONE OF TWO MODES

(71) Applicant: Aristocrat Technologies Australia Pty Ltd, North Ryde (AU)

(72) Inventors: Robert Linley Muir, Rosebery (AU); Brett Mezen, Rosebery (AU); Martin Lyons, Rosebury (AU); Steve Flores, Rosebury (AU)

(73) Assignee: Aristocrat Technologies Australia Pty Ltd (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,571

(22) Filed: Nov. 6, 2013

(65) Prior Publication Data

US 2014/0066175 A1 Mar. 6, 2014

Related U.S. Application Data

(60) Continuation of application No. 11/442,109, filed on May 25, 2006, now Pat. No. 8,585,499, which is a division of application No. 10/494,925, filed as application No. PCT/AU02/01462 on Oct. 29, 2002, now abandoned.

(51) Int. Cl.

*G06F 17/00* (2006.01)
*G06F 19/00* (2011.01)

(Continued)

(52) U.S. Cl.

CPC ............ *G07F 17/34* (2013.01); *G07F 17/3211* (2013.01)

USPC .................... 463/31; 463/16; 463/20; 463/32

(58) Field of Classification Search

CPC . G07F 17/32; G07F 17/3211; G07F 17/3213; G07F 17/3265; G07F 17/34

USPC ................. 463/16–20, 25, 29–32; 273/138.1, 273/143 R

See application file for complete search history.

(56) References Cited

U.S. PATENT DOCUMENTS 3,642,287 A 2/1972 Lally et al.
4,306,768 A 12/1981 Egging (Continued)

FOREIGN PATENT DOCUMENTS

JP 4114676 A 4/1992
JP 8117409 A 5/1996

(Continued)

OTHER PUBLICATIONS

International Search Report corresponding to International Application No. PCT/AU02/01462, Nov. 27, 2002.

*Primary Examiner* — Milap Shah

(74) *Attorney, Agent, or Firm* — McAndrews, Held & Malloy, Ltd.

(57) ABSTRACT

A gaming machine display (14) includes a game playing arrangement (16) mountable in a cabinet (62) of a gaming machine (10). An electronically controlled display element (50) overlies the game playing arrangement (16) so that, depending on a state of the display element (50), the game playing arrangement (16) is visible through the display element (50).

5 Claims, 8 Drawing Sheets

(51) Int. Cl.
*G07F 17/34* (2006.01)
*G07F 17/32* (2006.01)

(56) References Cited

U.S. PATENT DOCUMENTS

| | | | | |
|---|---|---|---|---|
| 4,718,672 | A | 1/1988 | Okada | |
| 5,228,693 | A | 7/1993 | Howard | |
| 5,351,966 | A | 10/1994 | Tohyama et al. | |
| 5,395,111 | A | 3/1995 | Inoue | |
| 5,596,693 | A | 1/1997 | Needle et al. | |
| 5,673,401 | A | 9/1997 | Volk et al. | |
| 5,752,881 | A | 5/1998 | Inoue | |
| 5,867,166 | A | 2/1999 | Myhrvold et al. | |
| 5,870,097 | A | 2/1999 | Snyder et al. | |
| 5,935,002 | A | 8/1999 | Falciglia | |
| 6,004,208 | A | 12/1999 | Takemoto et al. | |
| 6,089,977 | A | 7/2000 | Bennett | |
| 6,517,433 | B2 | 2/2003 | Loose et al. | |
| 6,937,298 | B2 | 8/2005 | Okada | |
| 8,585,499 | B2 * | 11/2013 | Muir et al. | 463/32 |
| 2001/0031658 | A1 | 10/2001 | Ozaki et al. | |
| 2002/0034976 | A1 | 3/2002 | Webb | |
| 2002/0175466 | A1 | 11/2002 | Loose et al. | |
| 2003/0032479 | A1 | 2/2003 | LeMay et al. | |
| 2003/0064781 | A1 * | 4/2003 | Muir | 463/20 |
| 2003/0087690 | A1 | 5/2003 | Loose et al. | |
| 2004/0029636 | A1 | 2/2004 | Wells | |
| 2004/0116178 | A1 | 6/2004 | Okada | |
| 2004/0150162 | A1 | 8/2004 | Okada | |
| 2004/0214637 | A1 | 10/2004 | Nonaka | |
| 2004/0219965 | A1 | 11/2004 | Okada | |
| 2005/0153772 | A1 | 7/2005 | Griswold et al. | |
| 2005/0192090 | A1 | 9/2005 | Muir et al. | |

FOREIGN PATENT DOCUMENTS

| | | | |
|---|---|---|---|
| JP | 10099483 | A | 4/1998 |
| JP | 10208025 | A | 8/1998 |
| JP | 2000300729 | A | 10/2000 |
| JP | 2000325597 | A | 11/2000 |
| JP | 2000350805 | A | 12/2000 |
| JP | 2001029590 | A | 2/2001 |
| JP | 2001062032 | A | 3/2001 |
| JP | 2001238995 | A | 9/2001 |
| JP | 2001252393 | A | 9/2001 |
| WO | 9303464 | A1 | 2/1993 |

* cited by examiner

GAMING MACHINE DISPLAY WITH A PLURALITY OF ZONES INDEPENDENTLY ADDRESSABLE TO SELECTIVELY OPERATE IN ONE OF TWO MODES

RELATED APPLICATIONS

This application is a Continuation of application Ser. No. 11/442,109, filed May 25, 2006, now issued U.S. Pat. No. 8,585,499, which is a Divisional of application Ser. No. 10/494,925, filed May 7, 2004, abandoned, entitled "Gaming Machine Display," which is a national phase of PCT/AU02/01462 with an international filing date of Oct. 29, 2002, herein incorporated by reference in their entirety.

BACKGROUND

1. Field

This invention relates to a gaming machine. More particularly, the invention relates to a gaming machine display, to a display means for a gaming machine display and to a method of displaying images on a gaming machine.

2. General Background

Players who regularly play gaming machines are, increasingly, demanding more features on the gaming machines. Venues which make use of gaming machines as a source of revenue also desire enhanced gaming machines to attract players to improve their source of revenue.

Various ways of enhancing gaming machines by means of the games played thereon have been proposed by the applicant.

However, in general, few changes have been made to the gaming machines themselves, apart from changes to cabinet design, or the like, in an attempt to modernise the appearance of the gaming machine and to enhance images displayed on a primary display of the gaming machine.

In addition, it is becoming increasingly popular to provide bonus events in the form of second screen features. Such second screen features may occur on a secondary display of the gaming machine. Where the secondary display is vertically spaced with respect to the primary display of the gaming machine, it requires a player to adopt a different vertical, viewing orientation. This can become taxing to a player leading to fatigue and, potentially, muscle pain. As a result the player's enjoyment of the gaming activity is reduced leading to the player's activity being curtailed. This defeats the purpose of adding the additional features to attract and retain players.

SUMMARY

According to a first aspect of the invention, there is provided a gaming machine display which includes:

a game playing arrangement mountable in a cabinet of a gaming machine; and an electronically controlled display means overlying the game playing arrangement, in use, so that, depending on a state of the display means, the game playing arrangement is visible through the display means.

Preferably, the game playing arrangement comprises an electro-mechanical, symbol carrying arrangement. The symbol carrying arrangement may comprise a set of rotatable mechanical reels, a plurality of symbols being arranged on an outer periphery of each reel.

The display means may comprise a display screen overlying the game playing arrangement. Preferably, the display screen is a multi-layered structure.

The structure may include a monitor on which images are to be displayed. In this specification, the term "monitor" is to be understood in a broad sense as any device on which varying images are displayed. In a preferred embodiment of the invention, the monitor is a flat panel, liquid crystal display (LCD).

The monitor may overlie a shutter mechanism. The shutter mechanism may be an electronically controlled device that is controllable to vary between a transparent state, in which the game playing arrangement is visible through the device, and an at least partially opaque state, in which the game playing arrangement is at least partially occluded. The shutter mechanism may be formed of electrically responsive crystals which change phase depending on a control signal applied to them. Thus, for example, the shutter mechanism may be formed of nematic curvilinear aligned phase (NCAP) liquid crystals.

The display may include a monitor housing defining a plurality of openings, one opening being associated with each reel, a part of the outer periphery of each reel being visible through its associated opening.

The electronically controlled device may therefore define a plurality of zones, each zone, in use, overlying one of the openings of the monitor housing and, hence, one of the reels, and each zone being controllable to vary between the transparent state, in which the associated reel is visible through that zone, and an at least partially opaque state, in which said reel is at least partially occluded.

A user interface layer may overlie the monitor. The user-interface layer may be implemented as a touchscreen. The touchscreen may employ surface acoustic wave technology.

In a preferred embodiment of the invention, the multi-layered structure may include an illuminating layer for illuminating the monitor. The illuminating layer may comprise a light transferring panel and an illuminating means arranged adjacent at least one edge of the panel. The panel may be a panel of a synthetic plastics material that is interposed between the monitor and the shutter mechanism.

In another embodiment of the invention, the game playing arrangement may be illuminated to render it visible through the monitor. The intensity of the illumination may be adjustable for adjusting the degree of visibility of the game playing arrangement through the monitor. In other words, by adjusting the illumination, the effect is created of adjusting the transparency of the monitor.

The monitor may be arranged in spaced relationship relative to the game playing arrangement such that, when an image appears on the monitor, it imparts a three-dimensional effect to a scene comprising the game playing arrangement and the image on the monitor. For example, win lines may be indicated on the monitor after a win occurs. The win lines may be animated over the top of those symbols of the game playing arrangement which make up the winning combination or winning combinations to highlight the win or wins, as the case may be.

In another embodiment of the invention, instead of the multi-layered structure, the display means may be a flat panel display, more particularly, a flat panel, liquid crystal display, alone.

According to a second aspect of the invention, there is provided a display means for a gaming machine display, the display means including:

a monitor on which images are to be displayed; and a shutter mechanism underlying the monitor, the shutter mechanism being controllable to vary between a transparent state, in which other images underlying the shutter mechanism, in use, are visible through the monitor, and an at least partially transparent state in which the other images are at least partially occluded when viewed through the monitor.

The display means may be a multi-layered structure having a user-interface layer overlying the monitor. The multi-layered structure may include an illuminating layer operatively arranged relative to the monitor to illuminate the monitor.

According to a third aspect of the invention, there is provided a method of displaying images on a gaming machine, the method including the steps of:

displaying a first set of images on a game playing arrangement mounted in a cabinet of the gaming machine; and displaying at least one further image on a display means overlying the game playing arrangement.

Preferably, the method includes controlling a state of the display means to control its transparency to regulate a degree of visibility, if any, of the game playing arrangement through the display means.

In addition, the method may include displaying at least one further image overlying an image of the game playing arrangement, said at least one further image being taken into account in determining an outcome of a game played on the gaming machine.

To enhance the appearance of the images, the method may include illuminating the display means to enhance the display of said at least one further image on the display means.

The method may include displaying the at least one further image on the display means as a moving animation. In addition, the method may include controlling the display of the at least one further image on the display means to provide an effective change in camera angle or a zooming in or out effect.

The invention extends also to a gaming machine which includes a gaming machine display, as described above.

DRAWINGS

The invention is now described by way of example with reference to the accompanying diagrammatic drawings in which.

DETAILED DESCRIPTION

Figure 1:
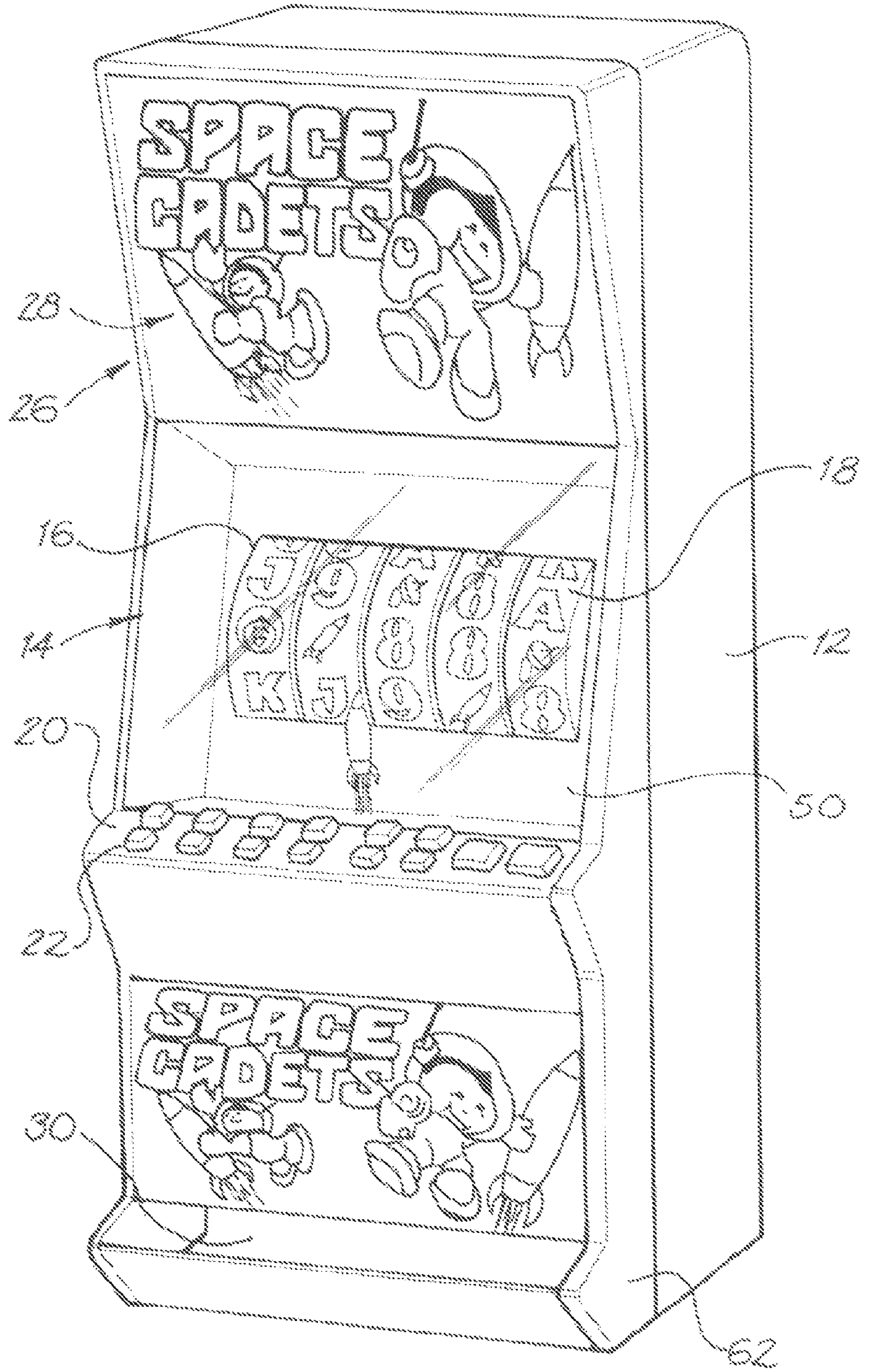
FIG. 1 shows a perspective view of a gaming machine, in accordance with the invention.

In FIG. 1, reference numeral 10 generally designates a gaming machine including a display 14, in accordance with the invention. The machine 10 includes a cabinet 12 housing the display 14.

The display 14 includes a game playing arrangement, or symbol carrying arrangement, 16 in the form of a plurality of mechanical reels 18 with each reel 18 carrying a plurality of symbols on an outer periphery of the reel 18. The reels 18 are used to play a spinning reel game.

A midtrim 20 of the machine 10 houses a bank 22 of buttons for enabling a player to play the game. The midtrim 20 also houses a credit input mechanism 24 (FIG. 2).

The machine 10 includes a top box 26 on which artwork 28 is carried. The artwork 28 includes paytables, details of bonus awards, etc.

A coin tray 30 is mounted beneath the cabinet 12 for cash payouts from the machine 10.

Figure 2:
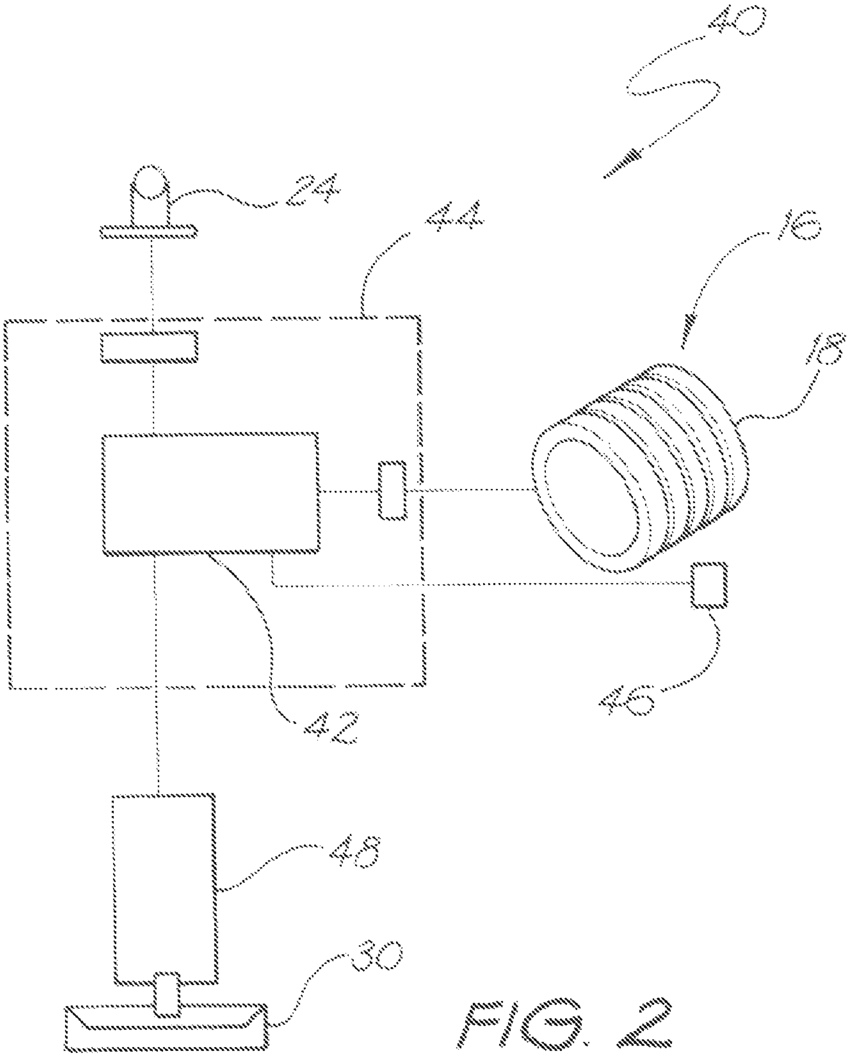
FIG. 2 shows a block diagram of a control circuit of the gaming machine.

Referring to FIG. 2 of the drawings, a control means or control circuit 40 is illustrated. A program which implements the game and user interface is run on a processor 42 of the control circuit 40. The processor 42 forms part of a controller 44 which drives the reels 18 of the symbol carrying arrangement 16 and which receives input signals from sensors 46 associated with the bank 22 of buttons and sensors 46 associated with a touchscreen of the display 14.

The controller 36 also receives input pulses from the credit input mechanism 24 to determine whether or not a player has provided sufficient credit to commence playing.

Finally, the controller 42 drives a payout mechanism 48 which, for example, may be a coin hopper for feeding coins to the coin tray 30 to make a pay out to a player when the player wishes to redeem his or her credit.

The display 14 includes a second display means in the form of a flat panel, liquid crystal display (LCD) 50 mounted operatively in front of the symbol carrying arrangement 16 so that the symbol carrying arrangement 16 is visible through the LCD 50.

Figure 3:
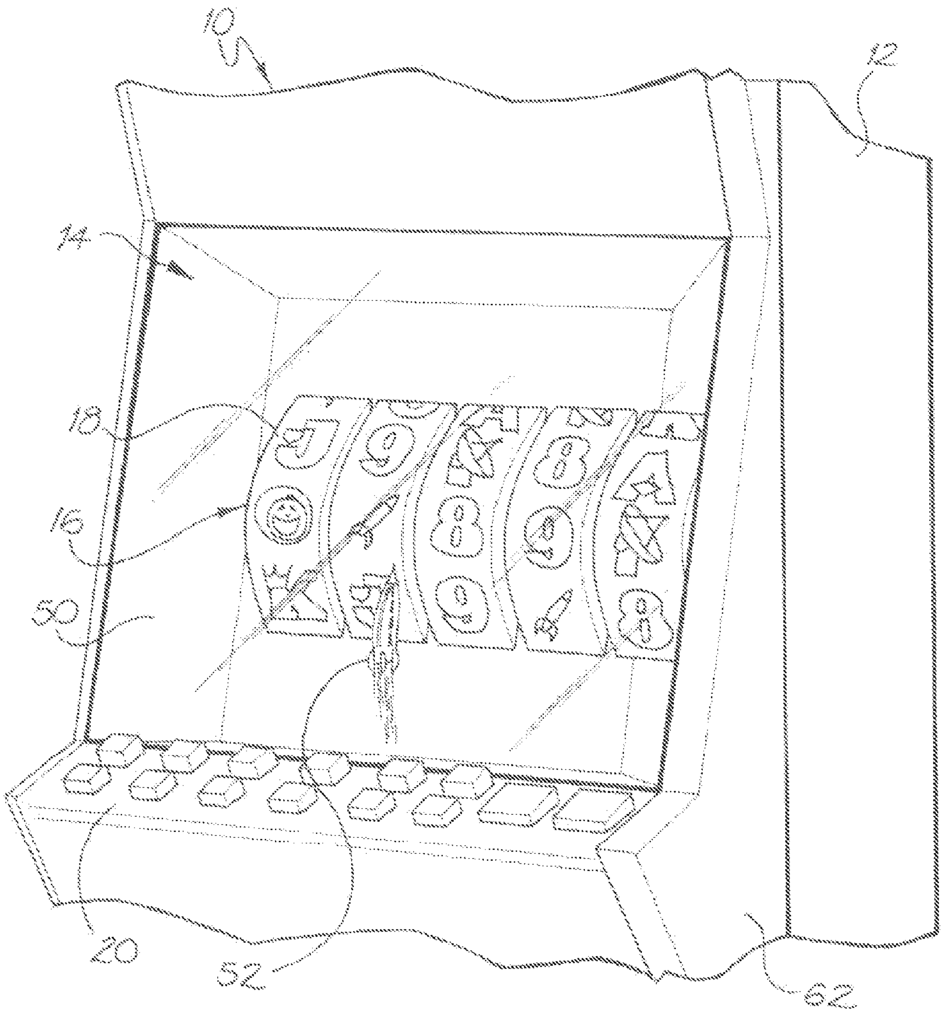
FIGS. 3 to 5 show three-dimensional views of part of the gaming machine with an animated image on a display means of a display of the gaming machine.
Figure 4:
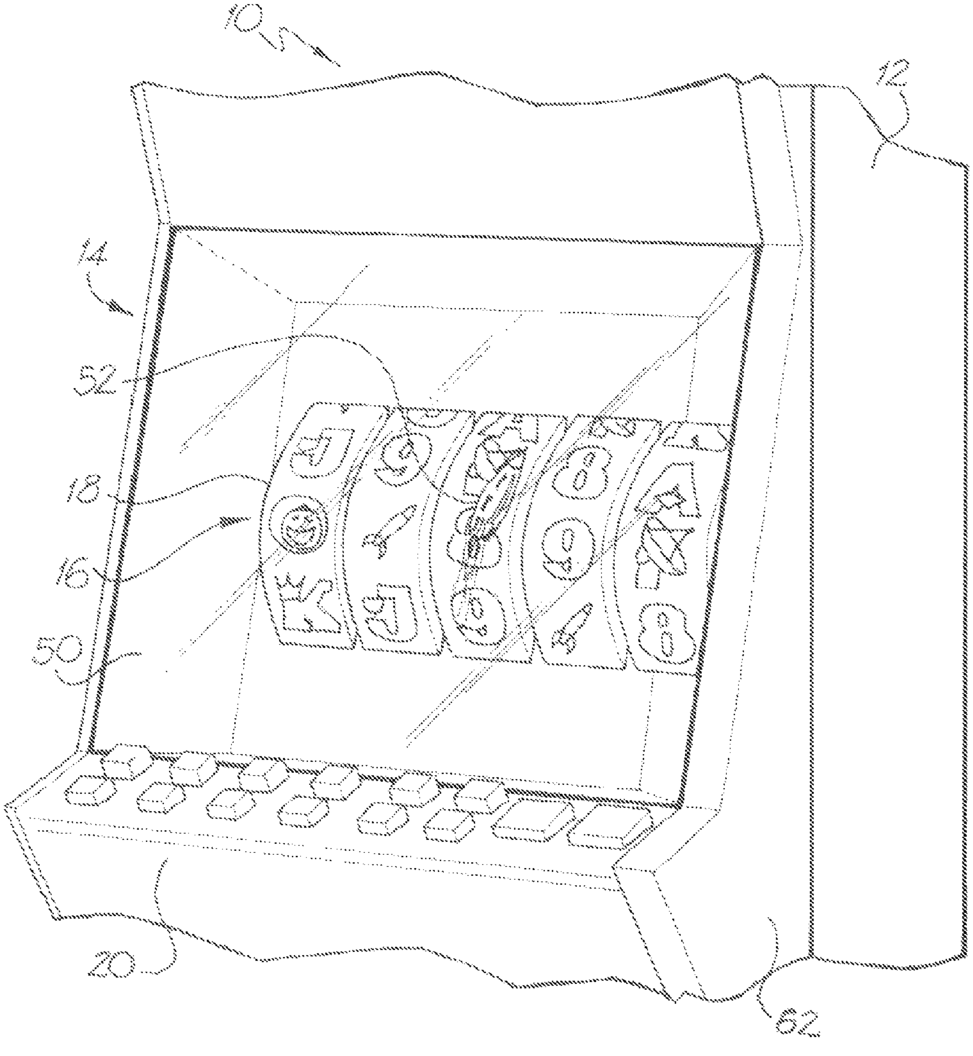
Figure 5:
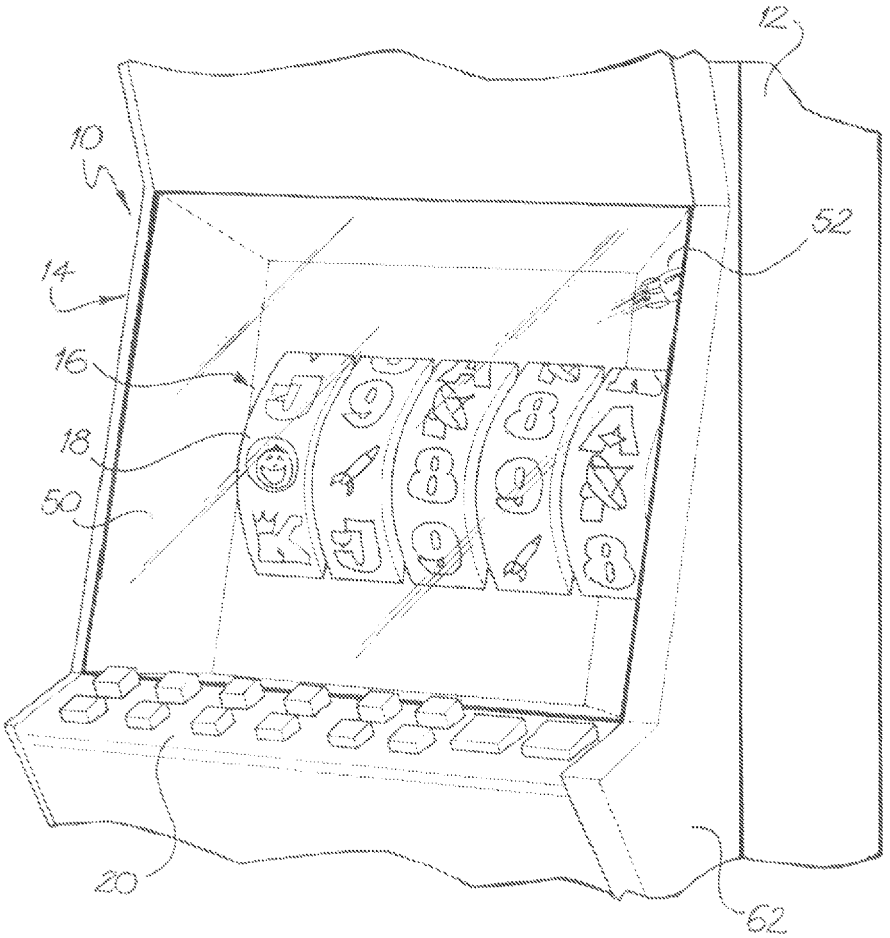

In the embodiment shown in FIGS. 3 to 5 of the drawings, the LCD 50 is an at least partially transparent display and carries at least one image 52 under certain circumstances thereon. In particular, the image 52 is related to the underlying spinning reel game played on the symbol carrying arrangement 16.

As indicated above, the LCD 50 is at least partially transparent so that images or symbols carried on the reels 18 of the symbol carrying arrangement 16 are visible through the LCD 50.

Figure 6:
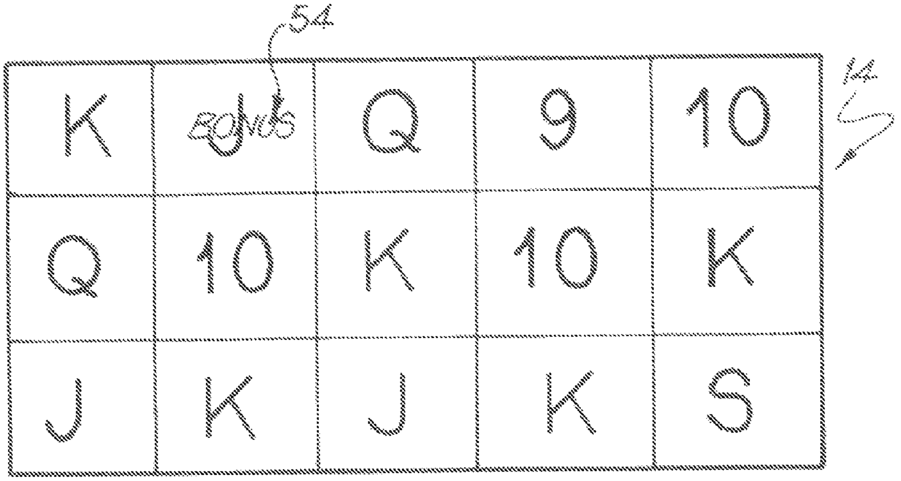
FIG. 6 shows a schematic representation of a first example of a screen display of the gaming machine.
Figure 7:
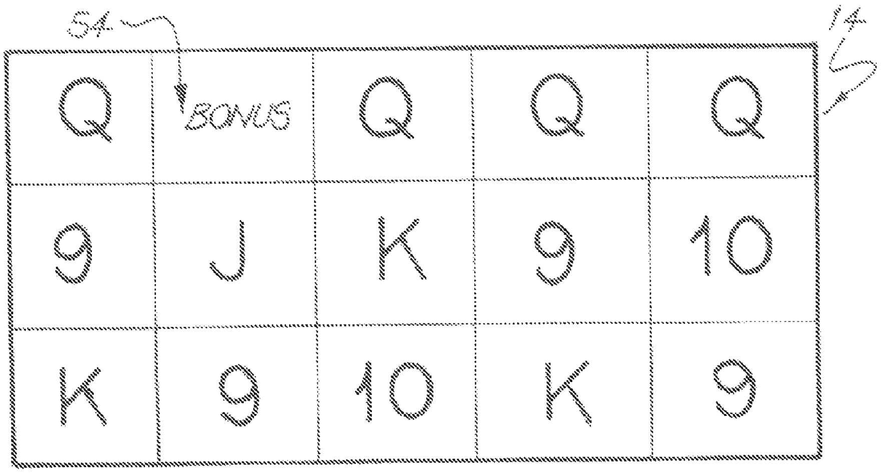
FIG. 7 shows a schematic representation of a second example of a screen display of the gaming machine.

In use, when a predetermined trigger condition occurs, at least one image 52 is displayed on the LCD 50. The image 52 may be related to the underlying base game which uses the symbol carrying arrangement 16. For example, as shown in FIGS. 6 and 7 of the drawings, when a particular trigger condition occurs in the base game, a “wild card” symbol 54 is displayed on the LCD 50, overlying one of the symbol positions on one of the reels 18. When the reels 18 stop spinning, the symbol 54 substitutes for the underlying symbol on the relevant reel 18. In the example shown in FIG. 6 of the drawings, the symbol 54 is transparent so that the underlying reel symbol is visible through the symbol 54. In the example shown in FIG. 7 of the drawings, the symbol 54 is opaque so that the underlying reel symbol position is covered and is hidden by the symbol 54 on the LCD 50. It will be appreciated that the above-described example could apply to a base game and/or to a special feature game.

In addition, the LCD 50 can be used for displaying messages as an attracting unit for attracting patrons to the machine 10. Further, the LCD 50 can be used for a second screen feature which is triggered when a trigger condition is spun up on the reels 18 of the symbol carrying arrangement 16. Still further, the LCD 50 could be used to carry advertising material which may be displayed when a game is not being played or could also be displayed while a game is being played.

If desired, the image 52 carried on the LCD 50 could overlie one of the symbol positions on one of the reels 18 to create a three-dimensional effect. Then, the controller 44 may be operable to vary "camera angles" and to provide a "zooming in or out effect" to enhance the three-dimensional effect.

Figure 8:
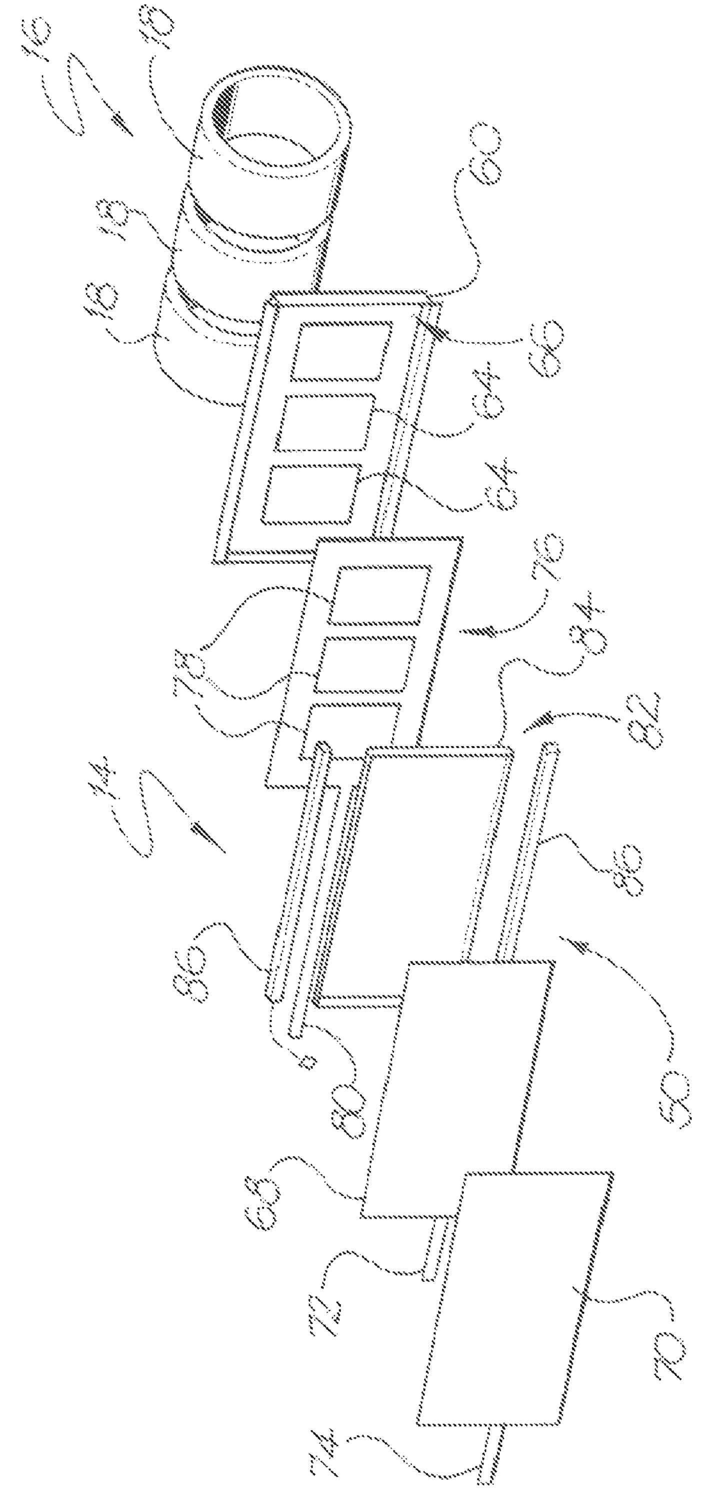
FIG. 8 shows a three dimensional, exploded view of a gaming machine display in accordance with another embodiment of the invention.
Figure 9:
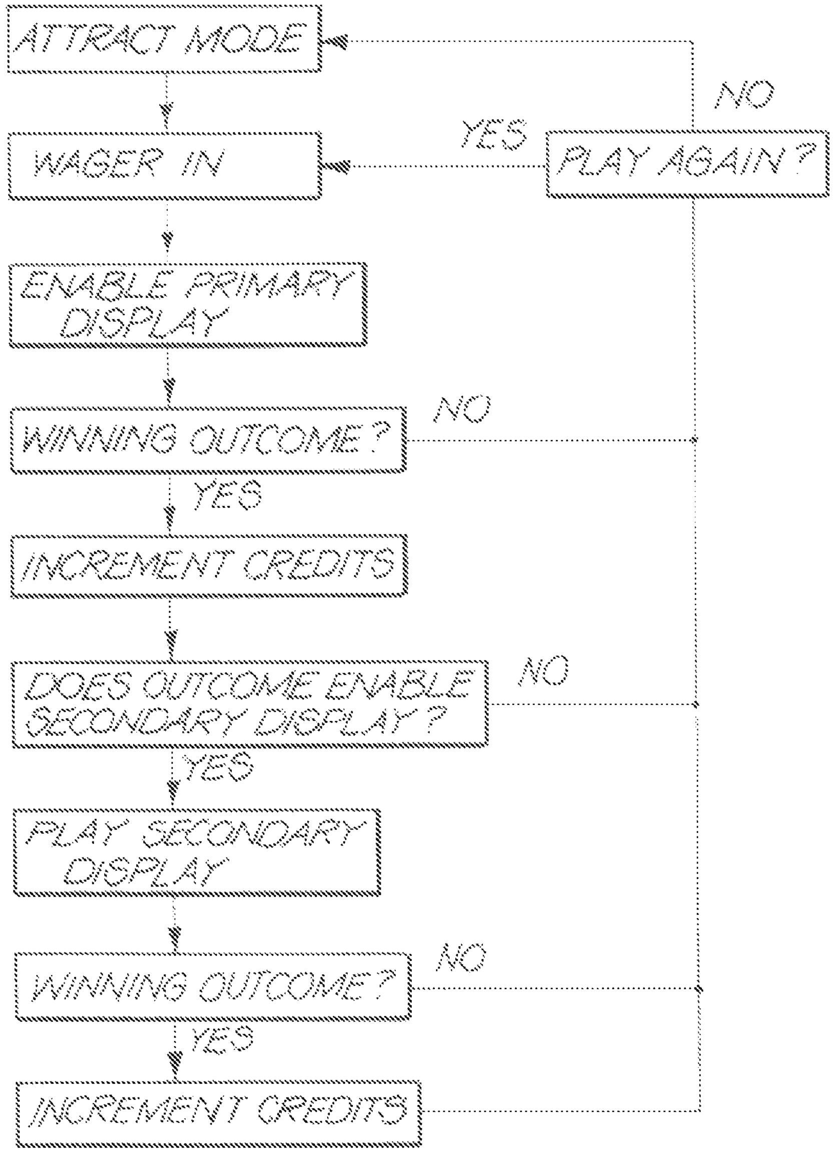
FIG. 9 shows a flow chart of a game played on the gaming machine of FIG. 1.

Referring to FIG. 8 of the drawings, a display 14, in accordance with a second embodiment of the invention is illustrated. With reference to the previous drawings, like reference numerals refer to like parts, unless otherwise specified.

The LCD 50 is a multi-layered structure overlying the symbol carrying arrangement 16.

For this purpose, the display 14 includes a monitor housing 60 which, in use, is secured to a door 62 (FIG. 1) of the gaming machine 10. The monitor housing 60 defines a plurality of apertures or openings 64. Each opening 64 of the monitor housing 60 is associated with one of the reels 18 of the symbol carrying arrangement 16.

The monitor housing further defines a recessed region 66 within which the LCD 50 is received.

The LCD 50 is a multi-layered structure and includes a glass panel LCD monitor 68. A user interface in the form of a touchscreen 70 is superimposed on the monitor 68.

The monitor 68 and the touchscreen 70 are connected via connectors 72, 74, respectively, to the controller 42 of the gaming machine 10.

The touchscreen 70 employs surface acoustic wave technology. Frets bound the touchscreen 70 and discern energy field disturbances. These disturbances are interpreted by the frets as decisions made coincident with touching the touchscreen 70 and the position at which the touchscreen 70 was touched.

The LCD 50 include a shutter mechanism 76 interposed between the monitor 68 and the monitor housing 60. The shutter mechanism 76 has zones or regions 78 which, in use, lie in register with the openings 64 in the monitor housing 60 and, accordingly, in register with those parts of the peripheries of the reels 18 visible through the openings 64.

At least the zones 78 of the shutter mechanism 76 are formed from a material responsive to varying energy levels. In particular, the zones 78 are formed from nematic curvilinear aligned phase (NCAP) liquid crystals.

Upon the application of appropriate energy levels, these NCAP crystals either render the zones 78 optically transparent allowing visual access to the parts of the reels 18 visible through the openings 64 in the monitor housing 60 or can be rendered opaque to form a background shutter for the LCD monitor 68 allowing the LCD monitor 68 to carry images with the reels 18 being hidden. In addition, the varying of the energy levels applied to the zones 78 of the shutter mechanism 76 allows varying degrees of transparency of those zones 78 to be achieved. The zones 78 of the shutter mechanism 76 are controlled by the controller 42 of the gaming machine 10 via a connector 80.

While it is envisaged that all of the zones 78 will operate in concert, it is also contemplated that the zones 78 could be independently addressable such as when a bonus round uses one or more of the reels 18 in the bonus event.

As a consequence, a gaming machine 10 is provided which includes a first display, being the symbol carrying arrangement 16, which can be selectively occluded by the second display being the LCD 50. The net effect is that a plurality of displays are stacked along a single visual path which reduces a visual footprint required to provide such plurality of displays. This also frees other areas of the cabinet 12 of the gaming machine 10 for other devices, artwork, or the like.

The visual impact imparted by the LCD 50 is enhanced by an illuminating layer in the form of a backlighting arrangement 82. The backlighting arrangement 82 includes a transparent panel 84 of a synthetic plastics material which, conveniently, is interposed between the monitor 68 and the shutter mechanism 76. The panel 84 supports a pair of opposed illuminating elements 86. The elements 86 can, for example, be in the form of fluorescent lamps. Additionally, illuminating elements (not shown) can be incorporated in the reels 18 for further visual enhancement.

With the provision of the display 14, it is possible for game play to be effected using the LCD 50 alone, the symbol carrying arrangement 16 on its own or both the LCD 50 and the symbol carrying arrangement 16. It is also contemplated that more than one LCD 50 could be incorporated in the display 14 with second and subsequent LCD's overlying the first LCD 50 of the display 14 in the same visual footprint.

Accordingly, it is an advantage of the invention that a gaming machine 10 is provided which has an enhanced display 14 in comparison with other gaming machines, in particular, those using mechanical reels 18 or other mechanical game playing arrangements such as pachinko machines, or the like.

Moreover, the display 14 is at the position of the primary display of a conventional gaming machine. It will be appreciated that, in general, there is only one optimal position at which to locate a display of a gaming machine. Most gaming machines are ergonomically designed so that the display of the gaming machine is at that optimal position for a person of average height. Thus, the enhanced display 14 of the present invention can be arranged at that optimal height with the added benefit that a feature game can be played on the LCD screen 50 at that height.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A display system for use with a gaming machine playing a game, the display system comprising:

a plurality of reels configured to spin and to display a plurality of two-dimensional symbols when said reels stop spinning;

a display substantially overlying the reels, and including a plurality of zones, each of said zones (1) directly overlying an associated one of said plurality of two-dimensional symbols when the underlying reel stops spinning, and (2) being independently addressable to selectively operate in a first mode in which the respective zone is rendered to be at least partially transparent through which the respective zone's said associated one of said plurality of two-dimensional symbols is viewable and is used in determining an outcome of said game, and a second mode in which the respective zone is rendered to be substantially opaque to occlude viewing of the zone's said associated one of said plurality of two-dimensional symbols and is configured to display an image related to the zone's said associated one of said plurality of two-dimensional symbols to provide a zoom effect of said image and to provide a three-dimensional effect of the zone's said associated one of said plurality of two-dimensional symbols, and a controller configured to selectively address a first zone of said plurality of zones to display said three-dimensional effect of the first zone's said associated one of said plurality of two-dimensional symbols via said second mode, and to selectively address a second zone of said plurality of zones adjacent to said first zone to display said three-dimensional effect of the second zone's said associated one of said plurality of two-dimensional symbols via said second mode while addressing said first zone to cause the first zone's said associated one of said plurality of two-dimensional symbols to be viewable through said first zone via said first mode.

2. The display system as claimed in claim 1, wherein the controller is further configured to selectively address a third zone of said plurality of zones adjacent to said second zone to display said three-dimensional effect of the third zone's said associated one of said plurality of two-dimensional symbols via said second mode while addressing said second zone to cause the second zone's said associated one of said plurality of two-dimensional symbols to be viewable through said second zone via said first mode.

3. The display system as claimed in claim 1, wherein the controller is further configured selectively display a blocking image occluding at least a portion of one of said plurality of two-dimensional symbols displayed on one of said reels.

4. The display system as claimed in claim 1, wherein at least two of said zones are partially overlapped.

5. The display system as claimed in claim 1, wherein a plurality of said plurality of zones covers areas adjacent to at least one of said plurality of reels.

* * * * *